United States Patent [19]

Leach

[11] Patent Number: 4,472,086

[45] Date of Patent: Sep. 18, 1984

[54] GEOTEXTILE FABRIC CONSTRUCTION

[75] Inventor: Jack Leach, Greensboro, N.C.

[73] Assignee: Burlington Industries Inc., Greensboro, N.C.

[21] Appl. No.: 238,660

[22] Filed: Feb. 26, 1981

[51] Int. Cl.³ .......................................... C09K 17/00
[52] U.S. Cl. ..................................... 405/258; 404/70; 405/32; 405/270; 428/253; 428/257; 428/489
[58] Field of Search ............... 428/109, 110, 253, 257, 428/284, 297, 298, 489; 66/192, 193; 404/70; 405/15, 16, 258, 32, 270

[56] References Cited

U.S. PATENT DOCUMENTS

| | | |
|---|---|---|
| 3,047,444 | 7/1962 | Harwood . |
| 3,279,221 | 10/1966 | Gliksmann . |
| 3,460,599 | 8/1969 | Leach . |
| 3,677,034 | 7/1972 | Simpson . |
| 3,696,623 | 10/1972 | Heine et al. . |
| 3,716,998 | 2/1973 | Lerche-Svendsen et al. . |
| 3,910,072 | 10/1975 | Svoboda et al. . |
| 3,928,696 | 12/1975 | Wandel et al. . |
| 4,002,034 | 1/1977 | Muhring et al. . |
| 4,183,993 | 1/1980 | Benstead et al. ................. 428/253 |
| 4,211,807 | 7/1980 | Yazawa et al. . |
| 4,298,645 | 11/1981 | Obayashi ......................... 428/253 |

FOREIGN PATENT DOCUMENTS 2005318 4/1979 United Kingdom .

OTHER PUBLICATIONS

"New Fabrics Without Weaving", K. W. Bahlo, American Assoc. For Textile Technology, Inc., Nov. 1965.

Primary Examiner—James J. Bell
Attorney, Agent, or Firm—Cushman, Darby & Cushman

[57] ABSTRACT

A geotextile fabric, method of manufacture and method of use, are provided. The composite geotextile fabric has a first group of uncrimped synthetic weft threads, a second group of uncrimped synthetic warp threads not interlaced with the first group, and a knit yarn stitch bonding the warp and weft threads loosely together. A nonwoven filtration fabric may also be included. The composite geotextile fabric may have a controlled extensibility, which preferably is equal to or less than the two to four percent extensibility of asphalt paving, making the fabric suitable for use in repairing cracked road surfaces and the like.

20 Claims, 10 Drawing Figures

GEOTEXTILE FABRIC CONSTRUCTION

BACKGROUND AND SUMMARY OF THE INVENTION

Geotextiles are fabrics which are used in road, dam, river, drainage and ocean construction sites for preventing erosion on river banks and seashores, and around piers and bridges, in paving of roads and as filtration fabrics in dam construction and as silt retainers to prevent erosion at construction sites. Geotextiles prevent the movement of soil or sand when placed in contact with the ground. When used in paving roads, geotextiles help maintain structural integrity of the road surface.

Woven and nonwoven geotextile fabrics are known. Nonwoven geotextiles are used in applications which require higher filtration capability than is obtainable with woven geotextiles, and large widths are necessary. Moreover, the high absorbancy of nonwoven geotextiles promotes adhesion to road surfaces and flow resistance to water. Geotextile fabrics of woven construction are used in applications requiring higher strength and structural stability than is obtainable with nonwoven geotextiles.

Nonwoven geotextiles which are reinforced with a woven backing are also known. For example, see U.S. Pat. Nos. 3,928,696 and 4,002,034.

In producing a geotextile fabric, it is particularly desirable to have controlled strength and controlled elongation, with high tear resistance and proper filtration also being highly desirable. According to the present invention, a geotextile fabric is produced that has excellent tear resstance, and very precisely controlled elongation and strength. For some particular uses of the geotextile fabric according to the invention, the extensibility is about 2 to 4%, making the fabric useful for solving "reflective cracking" problems in paving and the like.

The geotextile fabric according to the present invention basically comprises first and second groups of parallel synthetic threads, the two groups being arranged substantially transverse to each other, and preferably are truly perpendicular. Knit yarn stitch bonds the first and second group of threads loosely together. The threads are preferably uncrimped synthetic yarns, either continuous thread yarn or spun yarn. A nonwoven web may also be incorporated in the geotextile fabric, being stitch bonded to the first and second groups of threads. Thus, the geotextile fabric according to the present invention does not have the adhesive found in many prior geotextiles, does not have the fiber damage often accompanied with needle punched nonwovens, and doesn't require the heat-bonding of other prior fabrics. Only the basic yarn elongation is a factor in the fabric elongation so that it is precisely controllable, and since the interlacings and interweavings of warp and weft yarns as is provided in normal laid-in woven fabrics is not present, the geotextile fabric of the invention has extremely high tear resistance.

For road paving uses in particular, the yarn and web types comprising the preferred geotextile fabric are controlled so that the fabric has an extensibility of about 2 to 4% or less. This then makes the fabric ideal for repairing surfaces having cracks therein by placing a layer of geotextile fabric on a cracked surface, and placing a layer of asphalt on top of the geotextile fabric. This same basic procedure can be followed in reinforcing asphalt surfaces when they are laid, by laying a first layer of asphalt, placing the geotextile fabric on the first layer, and placing a second layer of asphalt on top of the geotextile fabric. In the instances cited above the geotextile fabric is saturated with a suitable quantity of liquid asphalt binder which acts as a sealant and adhesive between the layers of asphalt.

The method to making the geotextile fabric according to the present invention is readily practiced using horizontal weft insertion, and warp insertion, type knit-stitching machines, such as those produced by Liba and Mayer.

It is the primary object of the present invention to provide a geotextile fabric, and methods of utilization and production thereof, with precisely controllable properties. This and other objects of the invention will become clear from an inspection of the detailed description of the invention and from the appended claims.

BRIEF DESCRIPTION OF THE DRAWINGS

FIG. 4 is a sectional view of the composite fabric of FIGS. 1a and 1b taken along the X axis;

DETAILED DESCRIPTION OF THE DRAWINGS

Figure 7:
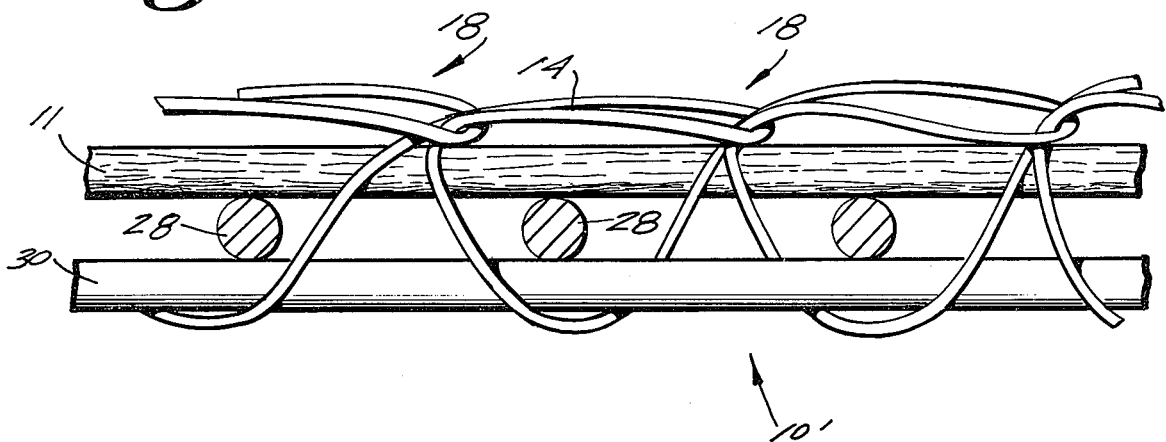
FIG. 7 is a sectional view of another exemplary composite geotextile fabric according to the present invention, including a nonwoven web.
Figure 8:
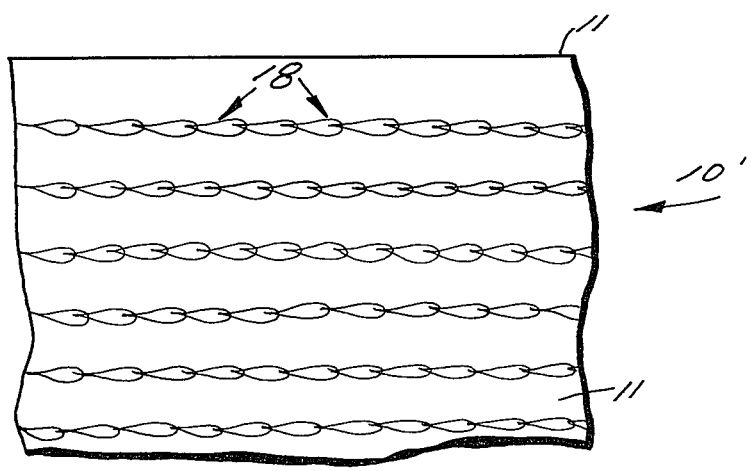
FIG. 8 is a bottom plan view of the fabric of FIG. 7.
Figure 9:
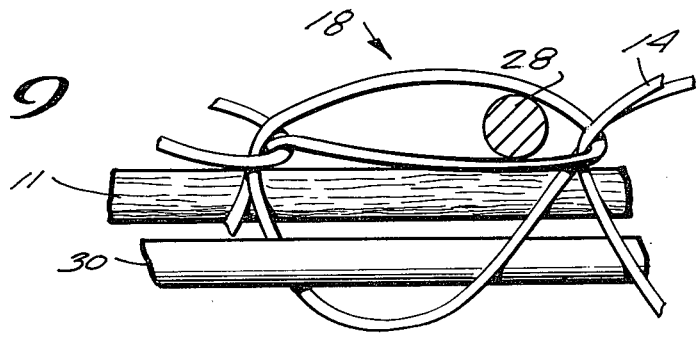
FIG. 9 is a sectional view of a modification of the fabric of FIG. 7.

One version of a geotextile fabric 10 according to the present invention is illustrated in FIGS. 1 through 5, while another version of geotextile fabric, 10', is illustrated in FIGS. 7 and 8, and still another version 10" in FIG. 9. The primary difference between the embodiments is that the embodiments of FIGS. 7 and 8 and FIG. 9 includes a nonwoven web 11 upon which the warp and weft threads are laid.

An exemplary geotextile fabric according to the present invention includes a first group of parallel synthetic weft threads 28, and a second group of parallel synthetic warp threads 30, the warp threads being substantially transverse (and preferably truly perpendicular) to the weft threads. Knit yarn stitch bonding, illustrated generally at 12, bonds the first and second groups of parallel threads 28, 30 loosely together. The knit yarn stitch bonding is accomplished utilizing a conventional horizontal weft, and warp, insertion type knit-stitching machine, such as produced by Liba or Mayer. Any type of stitching or knitting arrangement may be provided, such as chain loops, tricot loops, or the like. In the embodiment illustrated in the drawings, the knit yarn is constructed from two distinct threads of yarn, 14 and 16. The thread 14 is identified by cross hatching and the thread 16 is identified by the absence of cross hatching. The thread 14 is formed into a series of loops 18. Similarly, the thread 16 is formed into a series of loops 20. At the juncture 22 of each loop 18 and thread 16, the thread 16 travels away from the loop at an acute angle to its entering direction. Similarly, at the juncture 24 of each loop 20 and the thread 14, the thread 14 travels away from the loop at an acute angle to its entering direction. Each thread is composed of one or more filaments, or for some uses of spun yarn.

Figure 1A:
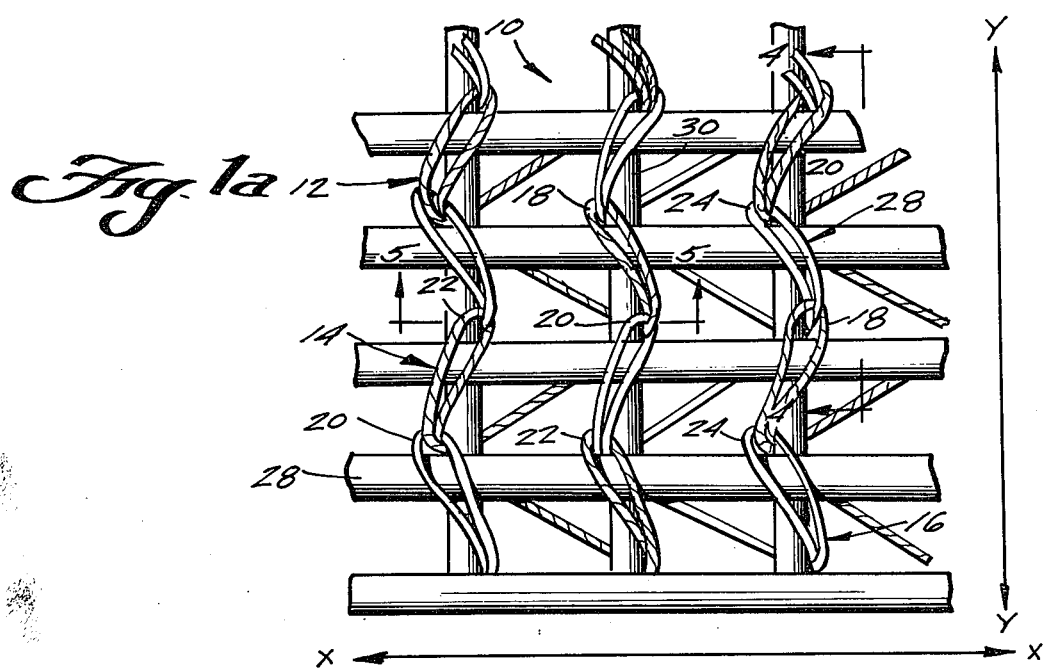
FIGS. 1a and 1b are top and bottom views of one exemplary composite geotextile fabric of the present invention.
Figure 1B:
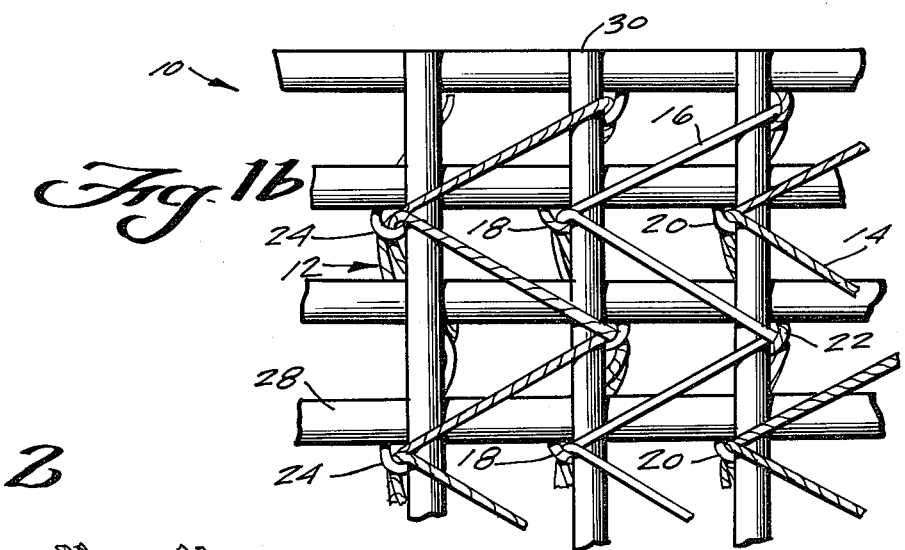
Figure 2:
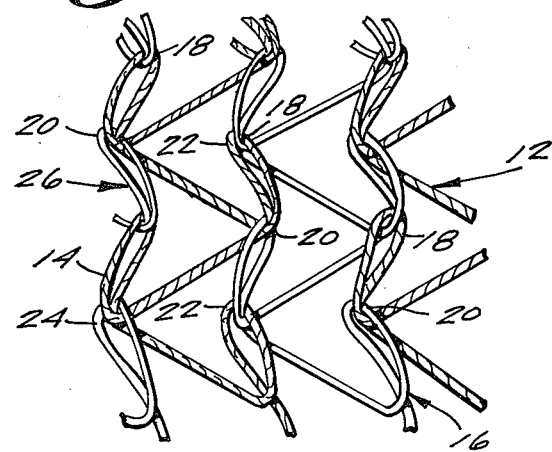
FIG. 2 is a plan view of the knitted yarn which is part of the composite fabric illustrated in FIGS. 1a and 1b.
Figure 1:
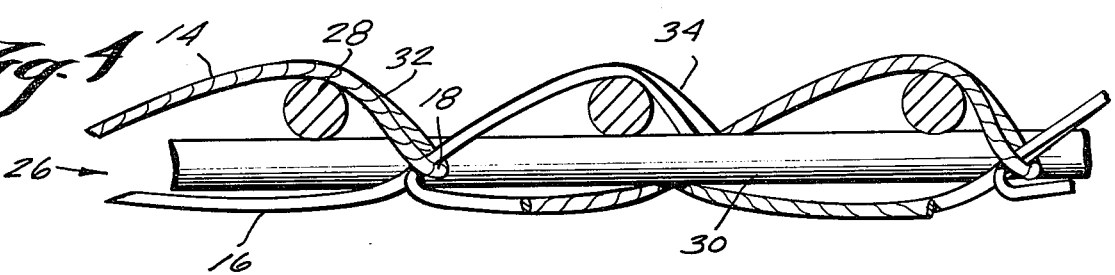

When viewed in the Y direction of FIG. 1, each course 26 of the knit yarn 12 of FIG. 2 is comprised of an alternating series of loops 18 and 20 which are formed from the two threads of yarn 14 and 16. Each course 26 includes a helical wrap of threads around the weft thread 30 of that course. The helical wrap is comprised of the alternating series of loops 18 and 20 which are disposed respectively to the right and left of the weft threads 30 (FIG. 1a) and the individual portions of the threads 14 and 16 which extend away from the loops 18 and 20 in planes above (FIG. 4) and below (FIG. 5) the weft and warp threads 28 and 30. Similarly when viewed from the X direction of FIG. 1a, the loops 18 and 20 alternate from course to course.

Figure 3:
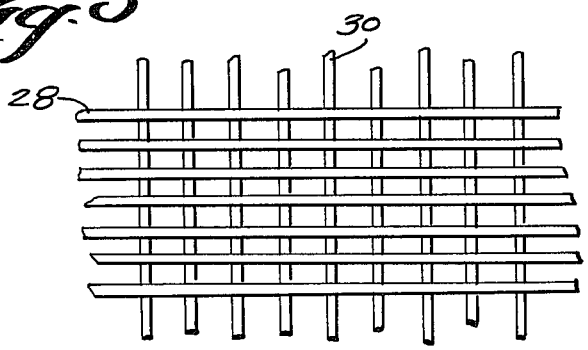
FIG. 3 is a plan view of the groups of warp and weft threads which are part of the composite fabric illustrated in FIGS. 1a and 1b.
Figure 5:
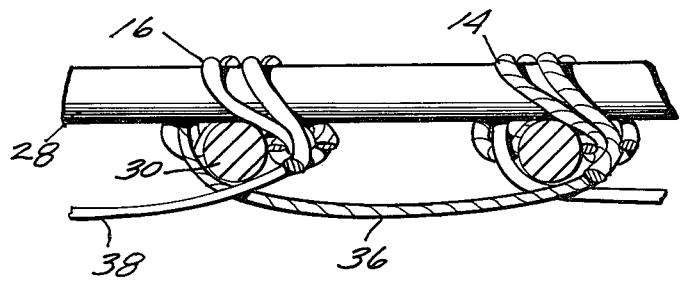
FIG. 5 is a sectional view of the composite fabric of FIGS. 1a and 1b taken along the Y axis.

FIG. 3 illustrates the two groups of warp and weft threads of synthetic yarn 28 and 30 which are part of the composite fabric illustrated in FIGS. 1a and 1b. The weft threads 28 are disposed on top of the warp threads 30, no interlacing or interweaving of the warp and weft threads being provided. FIG. 4, which is a section of the composite fabric 10 of FIG. 1 taken along the Y axis, illustrates that the parts 32 and 34 of the threads 14 and 16 extend above the planes of the warp and weft threads 28 and 30 at locations displaced from the loops 18 and 20. FIG. 5, which is a section of the composite fabric 10 of FIG. 1 taken along the X axis, illustrates that parts 36 and 38 of the individual threads 14 and 16 extend below the planes which contain the warp and weft threads 28 and 30.

The individual strands of yarn within the groups of warp and weft threads 28 and 30 should not be heat treated as is conventionally done to synthetic yarns to impart tactile and physical properties like those found in natural fibers. In this specification and appended claims the term "uncrimped synthetic thread" is used to identify only those yarns which have been made from synthetic materials and which have not been crimped by heat processing or the like to simulate properties of natural fibers.

The use of uncrimped synthetic yarns provides production of a composite fabric which has an extensibility which is equal to or less than the two to four percent extensibility of asphalt. Extensibility is the percentage of elongation which either asphalt or the composite fabric 10 will withstand in the X and Y directions of FIG. 1a without suffering inelastic deformation. When the groups of threads 28 and 30 are uncrimped synthetic threads, the composite fabric 10 will have an elasticity of about 2-4% or less. The knit yarn stitch bonding 12 does not contribute significantly to the aforesaid maximum permissible extensibility of the composite fabric 10 because of the inherent tendency of knits to stretch appreciably.

It is believed that when a cracked surface is repaired by placing a layer of composite fabric on top of it and then surfaced with asphalt, the cracks of the surface being repaired are not reflected through the new layer of asphalt in view of the fact that the extensibility of the composite fabric prevents the inelastic deformation of the asphalt which causes cracks to be reflected through the asphalt.

In the preferred form of the invention, the denier of the individual synthetic threads of the groups of threads 28 and 30 is greater than that of the knit yarn threads 14, 16, and may have a very wide range. Preferred synthetic materials include polyester or polypropylene, but the invention may be practice with other known synthetic materials. The denier of the groups of threads 28 and 30 determines the strength of the fabric, while thread spacing, and/or nonwoven web 11 characteristics, determine the filtration characteristics of the composite fabric 10, 10', 10".

The nonwoven web 11 in the FIGS. 7 and 8 embodiment may comprise any suitable nonwoven material having the desired filtration characteristics and the like for the particular use to which the geotextile fabric is to be put. Typical nonwoven fabrics suitable for this purpose are disclosed in U.S. Pat. Nos. 3,047,444; 3,928,696; and 4,002,034, the disclosures of which are hereby incorporated by reference herein.

FIG. 9 illustrates a geotextile fabric 10" much like that in FIGS. 7 and 8 only the web 11 is inserted between the transversely positioned warp and weft threads 28, 30, so that a higher density fabric may be provided.

Inclusion of the web 11 allows high elongations (15-40%) without exceeding filtration norms or limits in some cases. For instance in coastal erosion a thicker web held in place by a heavy warp and weft thread disposition (e.g. 6-8 threads per inch in each direction) would hold sand and silt in place under rip-rap to allow water movement while keeping the earth in place.

Figure 6:
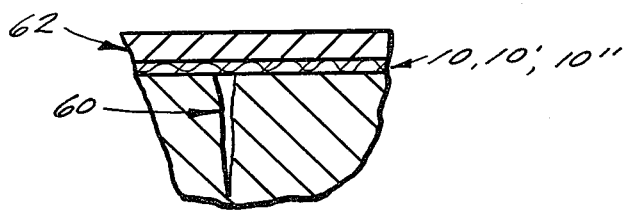
FIG. 6 is a sectional view illustrating the repair of a cracked road surface with the fabric of FIGS. 1a and 1b.

FIG. 6 illustrates a method of repairing a cracked road surface 60 with the composite fabric 10, 10', 10" of the present invention. The cracked road surface 60 is sprayed with liquid asphalt binder and then is covered with a section of geotextile fabric 10 in accordance with the invention. A layer of asphalt pavement 62 is placed on top of the fabric 10, and rolled. The resultant pavement resists reflection of cracks from the original road surface 60 up through the asphalt pavement 62 on account of the extensibility of the composite fabric 10, being equal to or less than the extensibility of the asphalt pavement.

The fabric according to the present invention may be used to reinforce new asphalt surfaces when first constructed. One possible method of reinforcing new asphalt surfaces is to lay a layer of new asphalt, place the composite fabric 10, 10', 10" on top of the new layer of asphalt, and place a second layer of asphalt on top of the layer of composite fabric.

The fabric 10, 10', 10" may also be used for fuel tanks, pond linings, steep slopes, and other geotextile uses (as that term is commonly understood in the art as described previously), and for some uses the warp or weft threads may be deleted.

While the present invention has been described in terms of preferred embodiments, it should be apparent to those persons skilled in the art that numerous modifications may be made without departing from the spirit and scope of the invention. It is intended that all such modifications should fall within the scope of the appended claims.

What is claimed is:

1. In combination with a road surface including asphalt, a geotextile fabric having controlled extensibility and disposed beneath a layer of said road surface including asphalt, and comprising:
   (a) a first group of parallel, substantially straight uncrimped threads of synthetic yarn disposed in a first direction;
   (b) a second group of parallel, substantially straight uncrimped threads of synthetic yarn disposed in a second direction which is substantially transverse to the first direction, on top of the first group of parallel threads;
   (c) knot yarn stitch bonding said first and second groups of parallel threads loosely together; and wherein
   (d) said geotextile fabric has an extensibility which is equal to or less than the extensibility of asphalt.

2. A geotextile combination as recited in claim 1 further comprising a web of non-woven fabric, said first and second groups of threads being disposed on said web, and said knit yarn stitch bonding said first and second groups of threads and said nonwoven loosely together.

3. A geotextile combination in accordance with claims 1 or 2 wherein the extensibility is about 2-4% or less.

4. In combination with a steep earthen slope, for preventing erosion of the slope, a geotextile fabric disposed on top of said slope, and having controlled extensibility, and comprising: a first group of parallel uncrimped synthetic threads disposed in a first direction; a second group of parallel uncrimped synthetic threads disposed in a second direction transverse to aid first direction and disposed so that they are not inter-woven or inter-laced with said first group; and knit yarns stitch bonding said first and second groups of threads loosely together.

5. A combination as recited in claim 4 consisting of the recited elements.

6. A combination as recited in claim 4 further comprising: a web of non-woven filtration fabric; said first and second groups of threads being disposed on said web, and said non-woven fabric and first and second groups of threads being held loosely together by said knit yarn stitch bonding.

7. A combination as recited in claim 6 consisting of the recited elements.

8. A combination as recited in claims 4, 5, 6, or 7 wherein the extensibility of the fabric is about 2-4 percent or less.

9. A combination as recited in claim 6 wherein said second group of threads lay on top of, and in contact with, said first group of threads.

10. A combination as recited in claims 4 or 6 wherein the denier of the threads of said first and second group of threads is greater than the denier of said knit yarn.

11. A combination as recited in claim 6 wherein said web is sandwiched between said first and second group of parallel threads.

12. In combination with a river bank for preventing erosion of the river bank, a geotextile fabric disposed on top of said river bank, and having controlled extensibility, and comprising: a first group of parallel uncrimped synthetic threads disposed in a first direction; a second group of parallel uncrimped synthetic threads disposed in a second direction transverse to aid first direction and disposed so that they are not inter-woven or inter-laced with said first group; and knit yarns stitch bonding said first and second groups of threads loosely together.

13. A combination as recited in claim 12 consisting of the recited elements.

14. A combination as recited in claim 12 further comprising: a web of non-woven filtration fabric; said first and second groups of threads being disposed on said web, and said non-woven fabric and first and second groups of threads being held loosely together by said knit yarn stitch bonding.

15. A combination as recited in claim 12 wherein the extensibility of the fabric is about 2-4 percent or less.

16. In combination with a seashore for preventing erosion of the seashore, a geotextile fabric disposed on top of said seashore, and having controlled extensibility, and comprising: a first group of parallel uncrimped synthetic threads disposed in a first direction; a second group of parallel uncrimped synthetic threads disposed in a second direction transverse to aid first direction and disposed so that they are not inter-woven or inter-laced with said first group; and knit yarns stitch bonding said first and second groups of threads loosely together.

17. A combination as recited in claim 16 further comprising: a web of non-woven filtration fabric; said first and second groups of threads being disposed on said web, and said non-woven fabric and first and second groups of threads being held loosely together by said knit yarn stitch bonding.

18. A combination as recited in claim 17 consisting of the recited elements.

19. A combination as recited in claim 16 wherein the extensibility of the fabric is about 2-4 percent or less.

20. A geotextile fabric having controlled extensibility, and lining a pond, disposed on top of the surface defining the pond, said fabric comprising: a first group of parallel uncrimped synthetic yarns disposed in a first direction; a second group of parallel uncrimped synthetic yarns disposed in a second direction transverse to said first direction and disposed so that they are not inter-woven or inter-laced with said first group; a web of non-woven filtration fabric, said first and second groups direction transverse to said first direction and disposed so that they are not inter-woven or inter-laced with said first group; a web of non-woven filtration fabric, said first and second groups of threads being disposed on said web; and knit yarn loosely holding said non-woven fabric and said first and second groups of threads together by stitch bonding.

* * * * *